No. 870,228. PATENTED NOV. 5, 1907.
H. F. DIETZ.
EMERGENCY BRAKE FOR AUTOMOBILES.
APPLICATION FILED MAY 16, 1906.

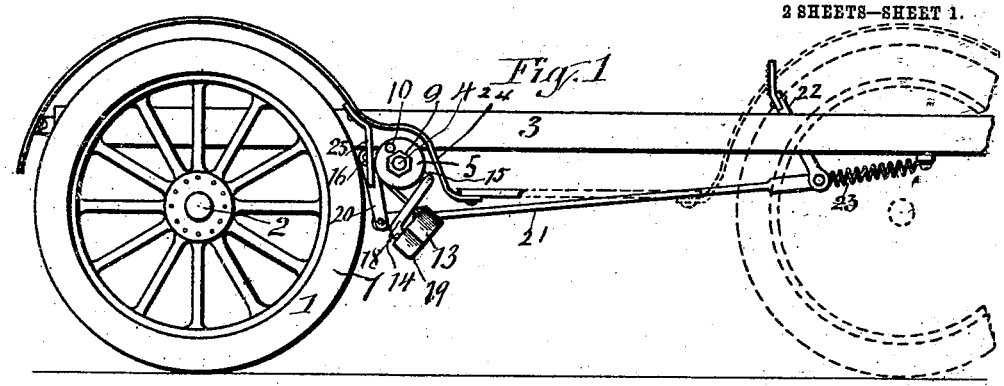
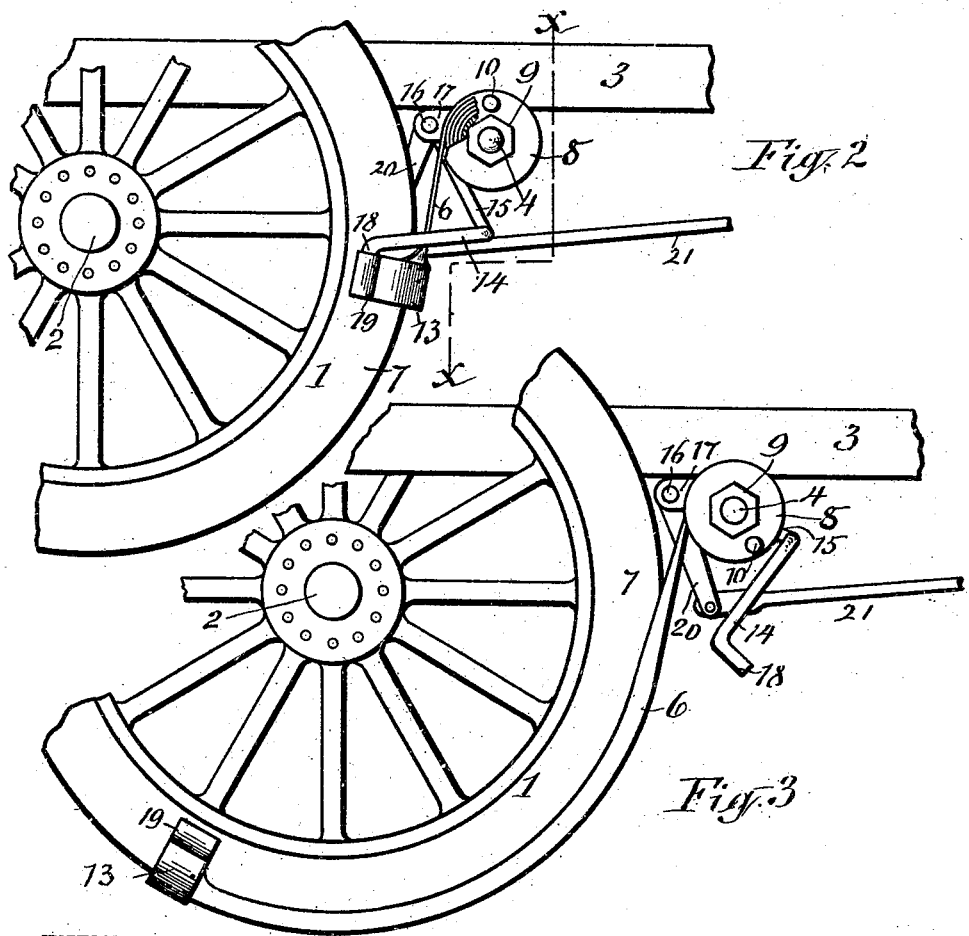

2 SHEETS—SHEET 2.

WITNESSES:

INVENTOR
Herman F. Dietz
By E. Laas
ATTORNEY.

UNITED STATES PATENT OFFICE.

HERMAN F. DIETZ, OF LIVERPOOL, NEW YORK, ASSIGNOR OF ONE-HALF TO ANTHONY WILL, OF SYRACUSE, NEW YORK.

EMERGENCY-BRAKE FOR AUTOMOBILES.

No. 870,228.  Specification of Letters Patent.  Patented Nov. 5, 1907.

Application filed May 16, 1906. Serial No. 317,051.

*To all whom it may concern:*

Be it known that I, HERMAN F. DIETZ, of Liverpool, in the county of Onondaga, in the State of New York, have invented new and useful Improvements in Emergency-Brakes for Automobiles, of which the following, taken in connection with the accompanying drawings, is a full, clear, and exact description.

This invention resides in a brake-mechanism which is more particularly adapted for automobiles and is designed to be used in cases of emergency to prevent accidents, incident to the loss of control of the vehicle caused by the failure of the regular braking-devices to arrest the travel of the vehicle, especially while descending steep grades, which failure may be due to lack of power of the braking-devices or to the disorder or breakage of some part or parts thereof. It is well known to persons familiar with motor-vehicles that such conditions have been quite common and have in many instances caused accidents resulting in loss of life.

The main object of the present invention is to provide an emergency-brake which can be quickly and conveniently operated and shall positively arrest the travel of the vehicle when required, and thus prevent such serious accidents.

Furthermore, the object of the invention is to provide a braking-mechanism which shall be simple, strong and durable in construction, reliable in its operation, and at the same time shall be neat and compact and also applicable to any well known style or make of motor-vehicle.

To that end the invention consists in the novel arrangement and combination of the component parts of of the emergency-brake hereinafter fully described and set forth in the claims.

Figure 4:
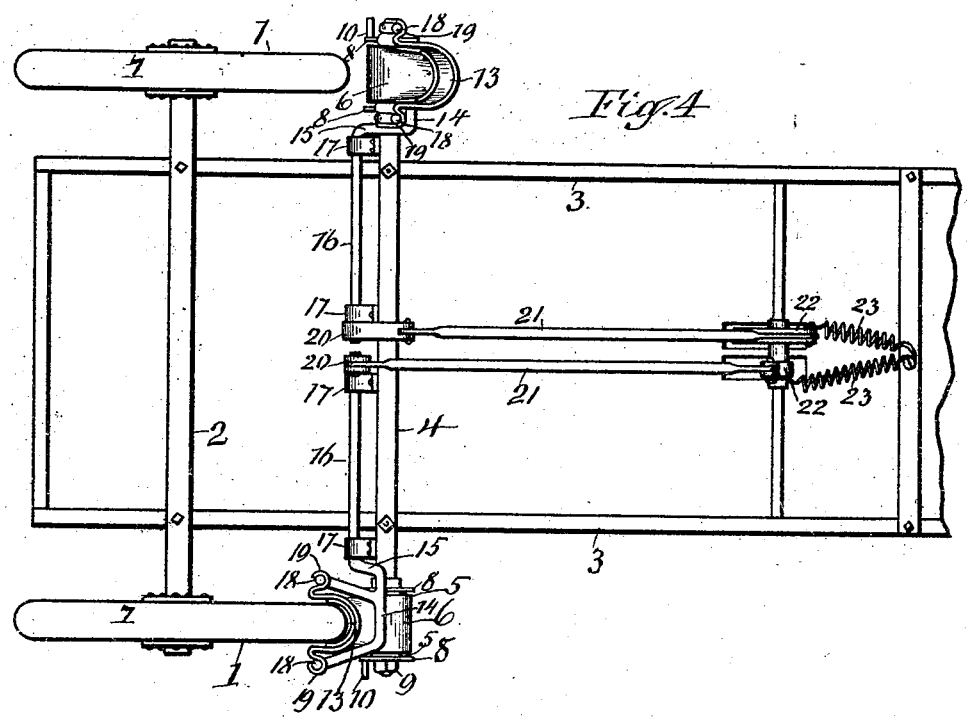
Figure 5:
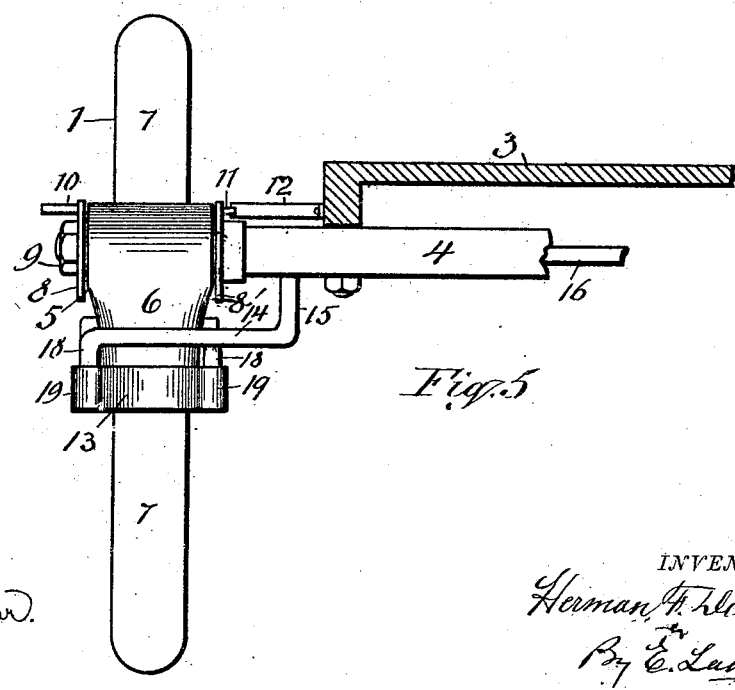

In the accompanying drawings Figure 1 represents a side view of a portion of the running-gear of an automobile provided with my emergency-brake, and showing the parts in normal positions; Fig. 2 is an enlarged detail side view showing the grip of a drag-shoe moved into engagement with a wheel-tire; Fig. 3 is also an enlarged detail side view showing a drag-shoe carried under a wheel; Fig. 4 is an inverted plan view showing the grip of one mechanism moved into engagement with the tire; and Fig. 5 is a transverse section on the line —X—X—.

Similar numerals of reference indicate corresponding part.

—1—1— denote the rear or driven-wheels of the automobile, and —2— is the axle thereof, upon which axle is mounted the usual frame —3— for supporting the vehicle-body. I prefer to employ separate and independently operated braking mechanisms for the said rear wheels, and inasmuch as these mechanisms are identical both in construction and operation, I will proceed to describe only one of the same.

—4— denotes a transverse shaft secured rigidly to the underside of the frame —3— and disposed in front of the rear wheels, and on each end of said shaft is journaled a roller —5—.

—6— represents a flexible band or strip which I term a "drag-shoe" and which may be composed of any suitable material such as strong rubber or leather, or it may be in the form of a chain-belt. This shoe or band is firmly fastened at one end to the roller —5— and is normally wound upon said roller, and it is of sufficient width to effectually protect the wheel-tire —7— when it is dragged under the wheel as hereinafter explained.

The roller —5— is provided on its ends with rigid collars —8—8— and it is held on the shaft —4— by a nut —9— applied to the screw-threaded end of the shaft. The outer collar of the roller is provided with a handle —10— by which to turn the said roller for the purpose of winding the flexible shoe thereon. The inner collar of the roller is provided on its outer face with a stud or pin —11— adapted to engage a yielding detent —12— which consists preferably of a spring-arm which extends lengthwise the shaft —4— and is rigidly fastened at its inner end to the shaft or frame —3— and has its outer or free end in the path of the pin or stud —11—. This detent, by its engagement with said pin, serves to prevent accidental turning of the roller and resultant unwinding of the shoe or band, and being adapted to yield, it allows the roller to turn when draft is exerted on the shoe when the latter is carried under the wheel —1— as will be shortly described.

To the free end of the flexible shoe is securely fastened a grip or clamp —13— consisting of a spring-steel plate bent substantially U-shaped and adapted to frictionally embrace the rubber-tire —7— of the wheel. This grip is normally supported on a fork —14— rigidly secured to or formed integral with a crank-arm —15— on the outer end of a rock-shaft —16— which is disposed back of and parallel with the shaft —4— and is journaled in suitable bearings —17—17—. The said fork —14— is disposed below the roller —5— and is adapted to straddle the wheel-tire when the crank-arm —15— is moved rearward. The ends of the fork-members are formed with offsets —18—18— which are adapted to engage spring-catches —19—19— provided on the clamp or grip —13— and thereby support the said grip when the flexible shoe is wound upon the roller —5—. These catches —19—19— are preferably formed by deflecting the end portions of the grip and crimping the said deflected portions as more clearly shown in Fig. 4 and 5 of the drawings.

To the inner end of the rock-shaft —16— is rigidly secured a downwardly extending lever —20— having its lower end pivotally connected to the rear end of a longitudinally disposed rod —21— which is pivotally connected at its forward end to a suitably supported foot-lever —22— which may be arranged in any convenient position. To the lower end of said foot-lever —22— is connected one end of a spiral-spring —23— which has its opposite end fastened to the frame —3—. This spring serves to draw the rod —21— forward when the lever —22— is released from the operator's foot, and thereby move the fork away from the wheel-tire, in which position the said fork normally supports the aforesaid grip or clamp —13—. In case it is found impossible to arrest the travel of the vehicle by application of the usual brake-devices, the person in charge pushes the foot-lever —22— forward, by which movement the rod —21— is shifted rearward and the rock-shaft —16— actuated to cause the fork —14— to swing rearwardly and upwardly to straddle the wheel-tire, whereby the spring-clamp or grip —13— is forced onto the said tire. By effecting a secure hold of the grip on the tire, the said grip becomes disengaged from the fork —14— and is carried with the tire, whereby the flexible shoe or band —6— is unwound from the roller —5— and caused to drag under the wheel, and thus the motion of the vehicle is positively arrested. Upon removing the foot from the lever —22—, the aforesaid spiral-spring —23— throws the upper end of the lever rearward and at the same time draws the rod —21— forward, whereby the rock-shaft —16— is actuated and the crank-arm —15— caused to throw the fork —14— forward to its normal position.

It will be understood that when the vehicle is brought to rest, the operator reverses the usual power-transmission mechanism and starts the engine or motor so as to drive the vehicle rearward to carry the grip or clamp forward with the wheel and thus permit the said grip to be removed from the tire. After removing the grip, the roller —5— may be rotated by means of the handle —10, whereby the shoe is wound upon the roller. When the shoe is thus wound upon the roller, it is prevented from accidentally unwinding by the engagement of the stud or pin —11— with the detent —12—, whereupon the grip may be readily attached to the offsets —18—18— on the fork —14— in which position it is normally carried.

It is obvious that by equipping an automobile with the described emergency-brake, it can be quickly stopped when required and thus avert serious accidents. In case the brake is applied while the vehicle is descending a steep grade, the wheels may be blocked by any suitable object after the vehicle has been propelled rearward to carry the wheel off from the shoe, and thus permit the latter to be wound upon the roller and the grip to be placed on its support. If it is found that one of the described braking-mechanisms is incapable of holding the vehicle, as in descending an extremely steep grade, the operator may employ both mechanisms.

While I prefer to employ two separate and independently operated brake-mechanisms, at the same time I wish it to be understood that these mechanisms may be arranged to operate as one to carry both of the grips into operative positions, in which instance only one rock-shaft and one foot-lever are required.

The described roller, shoe and grip are protected from dirt &c. by the guard —24— and a supplemental guard —25—.

What I claim is:—

1. A vehicle brake, a support, a flexible connection carried by said support, and clamping means carried by the flexible connection adapted to engage the wheel of the vehicle and draw said flexible connection thereunder.

2. A vehicle brake, a drum, a flexible connection wound thereabout, a clamping shoe attached to the flexible connection, and means for forcing said shoe into engagement with the vehicle wheel, acting to draw said flexible connection thereunder.

3. A vehicle brake, a shaft, flexible connections supported by said shaft and adapted to be wound thereabout, and clamping means carried by said flexible connections designed to engage the wheels of the vehicle when thrown in contact therewith, acting to draw said flexible connections thereunder.

4. In a vehicle, the combination with a wheel having a rubber-tire, and a suitable support disposed in front of the wheel, of an emergency-brake comprising a flexible band rigidly fastened at one end to said support, a grip secured to the other end of the band and normally sustained out of contact with the tire, and means for forcing the grip onto the tire whereby the said grip is carried under the wheel and back of its bearing upon the ground so as to cause the band to be dragged under the tire as set forth.

5. In a vehicle having rubber-tired wheels, the combination with a frame, an emergency-brake comprising a flexible band suitably fastened at one end to the frame, a grip securely fastened to the other end of the band and consisting of a curved spring-plate adapted to engage a wheel-tire, a movable support normally sustaining the grip out of contact with the tire, manually-operated means for moving said support to force the grip onto the tire whereby the grip is carried therewith to drag the flexible band under the tire, and spring-actuated means automatically moving the grip-support to its normal position as set forth.

6. In a vehicle having rubber-tired wheels, the combination with the running-gear frame and a rear wheel, of an emergency-brake comprising a flexible band suitably connected at one end to the frame and provided at its other end with a grip adapted to engage the wheel-tire, an arm pivotally connected to the frame in front of the wheel and normally supporting the grip out of contact with the wheel-tire, manually-operated means for swinging said arm toward the wheel to force the grip onto the tire, whereby the said grip is carried with the wheel back of its bearing upon the ground so as to drag the flexible band under the tire, and a spring operative for swinging the aforesaid arm to its normal position as set forth.

7. In a vehicle having rubber-tired wheels, the combination with the running-gear frame and a rear wheel, of an emergency-brake comprising a flexible band firmly fastened at one end to the frame and provided at its other end with a U-shaped grip adapted to engage the wheel-tire, a movable forked-member connected to the frame and normally supporting the grip out of contact with the tire and adapted to straddle the tire, a manually-operated lever for moving said forked-member toward the wheel to force the grip onto the tire whereby the grip is carried with the tire to drag the band thereunder, and a spring operative for moving the forked-member to its normal position as set forth.

8. In combination with a vehicle having rubber-tired wheels, an emergency-brake comprising a transverse roller suitably journaled in front of a wheel, a flexible band connected at one end to the roller and normally wound thereon, and provided at its other end with a grip consisting of a U-shaped spring-plate adapted to engage the wheel-tire and provided with spring-catches, a suitably supported transverse rock-shaft disposed back of said roller, an arm fastened at one end to the rock-shaft and provided on its free end portion with means for engaging said spring-catches to normally support the grip out of contact with the wheel-tire, a foot-lever connected to the rock-shaft and operative for swinging the arm toward the wheel to force the grip onto the tire whereby the grip is carried therewith to drag the flexible band under the tire, and a spring operative for automatically swinging the arm to its normal position as set forth.

9. In combination with a vehicle having rubber-tired wheels, an emergency-brake comprising a rigid transverse shaft supported in front of the rear-wheels, a roller journaled on the shaft adjacent to one of the wheels, a flexible band securely fastened at one end to the roller and normally wound thereon, a grip fastened to the other end of the band and consisting of a U-shaped spring-plate adapted to engage the wheel-tire and having its ends bent to form catches, a rock-shaft supported back of the roller-shaft, an arm fastened at one end to the rock-shaft and provided on its free end with a fork having its members terminating in offsets to receive the catches on the grip to normally support the latter out of contact with the wheel-tire, a foot-lever connected to the rock-shaft and operative for swinging the said arm toward the wheel to cause the fork-members to straddle the wheel-tire and thereby force the grip onto the tire, whereby the said grip is carried with the tire to drag the flexible band thereunder, and a spring connected to the foot-lever and serving to swing the arm to its normal position as set forth.

10. In combination with a vehicle having rubber-tired wheels, an emergency-brake comprising a transverse roller suitably journaled in front of a wheel, a drag-shoe consisting of a flexible band connected at one end to the roller and normally wound thereon and provided at its opposite end with a grip normally supported in front of the wheel and below the roller, a spring retaining the grip out of contact with the wheel-tire when it is in its normal position, a yielding detent serving to prevent accidental unwinding of the drag-shoe from the roller, and a lever for moving the grip-support toward the wheel-tire whereby the said grip is caused to engage the tire and carry the shoe under the wheel as set forth.

11. In combination with a vehicle having rubber-tired wheels, an emergency-brake comprising a drag-shoe composed of a flexible band having a suitable rigid fastening at one end and provided at its opposite end with a grip consisting of a curved spring-plate adapted to engage the wheel-tire and thereby carry the shoe under the wheel, a forked crank-arm normally supporting said grip out of contact with the wheel-tire, means for moving the crank-arm toward the tire to force the grip thereon, and a suitably arranged spring operative for moving the crank-arm to its normal position as set forth.

12. In combination with a vehicle having rubber-tired wheels, an emergency-brake comprising a drag-shoe composed of a flexible band suitably fastened at one end and provided at its opposite end with a grip consisting of a curved spring-plate conforming to the wheel-tire, a transverse rock-shaft, a crank-arm fastened to said rock-shaft and provided with a fork adapted to straddle the tire, said fork terminating in offsets on which the said grip is normally supported, means for turning the rock-shaft in one direction to force the grip onto the tire, whereby the said shoe is carried under the wheel, and a spring for turning the rock-shaft in reverse direction to move the fork to its normal position as set forth.

HERMAN F. DIETZ.

Witnesses:
J. J. LAASS,
L. H. FULMER.